United States Patent [19]

Chang

[11] Patent Number: 5,224,916
[45] Date of Patent: Jul. 6, 1993

[54] DOOR MOVING MECHANISM FOR A CUTTING MACHINE

[75] Inventor: Chien-Chun Chang, Taichung Hsien, Taiwan

[73] Assignee: Leadwell CNC Machines Mfg., Corp., Taiwan

[21] Appl. No.: 908,405

[22] Filed: Jul. 6, 1992

[51] Int. Cl.⁵ ............................................ B23Q 3/157
[52] U.S. Cl. ............................................ 483/3; 74/612
[58] Field of Search ............... 483/2, 3, 1, 54, 56, 483/55, 69, 31, 35, 36; 83/860, 397; 409/134, 254; 74/612, 615

[56] References Cited

U.S. PATENT DOCUMENTS

| | | | |
|---|---|---|---|
| 3,355,799 | 12/1967 | Daugherty | 483/3 |
| 3,930,302 | 1/1976 | Ochiai et al. | 483/3 |
| 4,499,650 | 2/1985 | Cannon et al. | 483/3 |

FOREIGN PATENT DOCUMENTS 135872 6/1979 Fed. Rep. of Germany .......... 483/3
165950 10/1983 Japan ...................................... 483/3
610432 10/1948 United Kingdom ................... 74/612

Primary Examiner—William Briggs
Attorney, Agent, or Firm—Ladas & Parry

[57] ABSTRACT

The door moving mechanism of a cutting machine includes an upright support, a machine body adjacent to the upright support and a horizontal guide rail mounted on the machine body immediately above the upright support. A connecting rod slidably provided on the guide rail has a first end connected to a door, and a second rod has a first end pivotally connected to a second end of the first rod and a second end pivotally connected to a second end of the connecting rod. The first rod has a first and second lobed part formed adjacent to the pivot point and cooperatively defining a receiving space between them. A push rod is provided on a casing movably mounted on the upright support and has a free end extending into the receiving space to push one of the lobed parts when the casing travels up and down along the upright support.

1 Claim, 5 Drawing Sheets

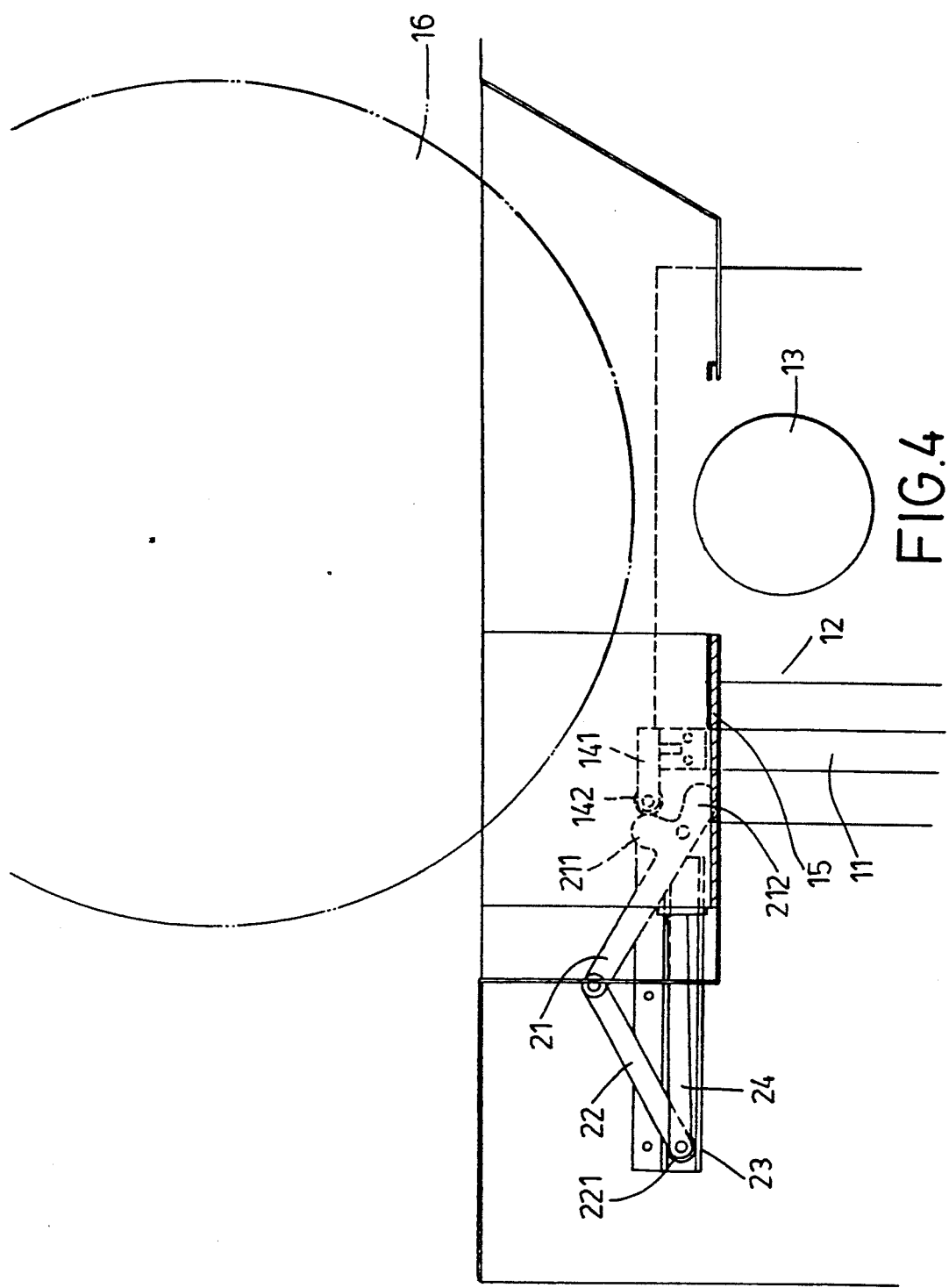

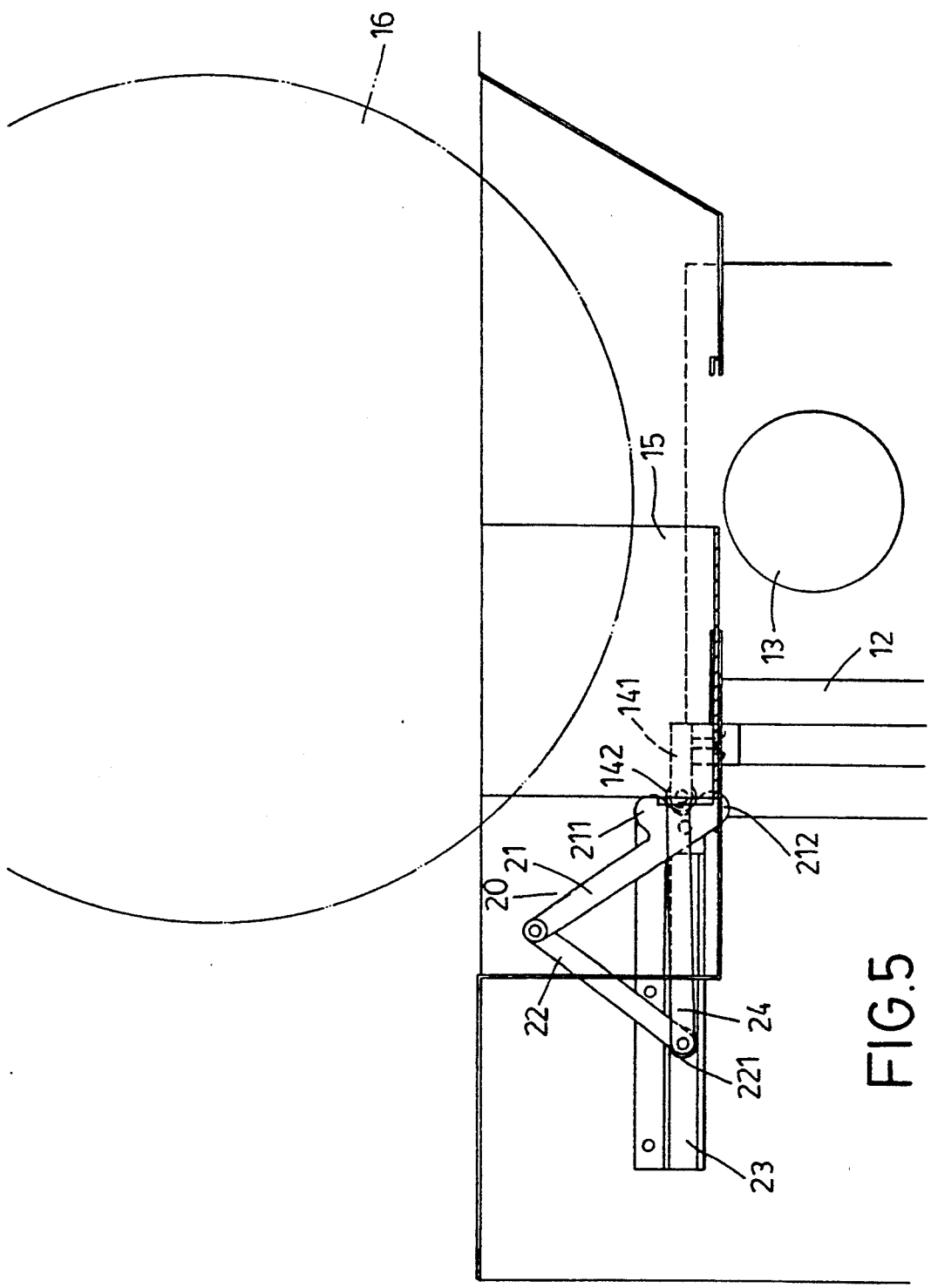

DOOR MOVING MECHANISM FOR A CUTTING MACHINE

BACKGROUND OF THE INVENTION

1. Field of Invention

The invention relates to a cutting machine, more particularly to a door moving mechanism for moving a door to cover a casing of the cutting machine in which a cutting device is operably provided such that scraps and juice of meat and the like being cut therein will not spill out from the casing.

2. Description of the Related Art

A conventional cutting machine includes a machine body, an upright support adjacent to the machine body and a casing mounted on the upright support movable upward and downward along the upright support. The casing has a surrounding wall with an open top and a cutting device is provided therein and is operable when the casing is moved downward to a first position. The cutting machine also includes a cutter exchanging plate rotatably mounted on the machine body above the upright support and adapted to exchange with a cutter of the cutting device of the casing when the casing is moved upward to a second position above the first position. The machine further includes a door provided on the machine body above the upright support between the cutter exchanging plate and the upright support slidable in a horizontal direction for covering the casing when it is at the first position and to uncover the casing at the second position. The door is slidably moved by a cylinder piston provided on the machine body above the upright support and having a piston rod connected to the door. The cutting machine further has a photo sensor which generates a signal to actuate the cylinder piston so as to move the door and cover the open top of the casing when the casing is at the first position and another signal to uncover the open top when the casing is at the second position. In order to move the door between the covering and uncovering positions, the piston rod must travel a full length in the cylinder casing.

SUMMARY OF THE INVENTION

A main object of the present invention is to provide a door moving mechanism having a particular structure and including a push means provided on the casing and movable along the upright support such that only a slight movement of the push means can move the door to cover and uncover the open top of the casing.

According to the present invention, the door moving mechanism incorporated in the prior art cutting machine includes a horizontal guide rail disposed on the machine body immediately above the upright support, a connecting rod slidably provided in the guide rail and having a first end connected to the door, and an elongated first rod having a first end pivoted on the machine body adjacent to the guide rail and the upright support and a second end. An elongated second rod has a first end pivoted to the second end of the first rod and a second end pivoted to a second end of the connecting rod. The elongated first rod further has first and second lobed parts formed adjacent to the pivot point thereof, each of which includes a first contact face and a second contact face. The first and second contact faces cooperatively define a receiving space therebetween, each of which is above and below a horizontal line drawn across the pivot point of the first rod. A push means is provided at a topmost portion of the casing and includes a free end extending into the receiving space to abut against one of the first and second contact faces upon movement of the casing along the upright support.

BRIEF DESCRIPTION OF THE DRAWINGS

Other features and advantages of the present invention will become apparent in the following detailed description, including drawings, all of which show a non-limiting form of the present invention, and in which:

FIG. 4 is the door moving mechanism of the present invention illustrated at a first position during operation; and FIG. 5 is the door moving mechanism of the present invention illustrated at another position during operation.

DETAILED DESCRIPTION OF THE PREFERRED EMBODIMENT

Figure 1:
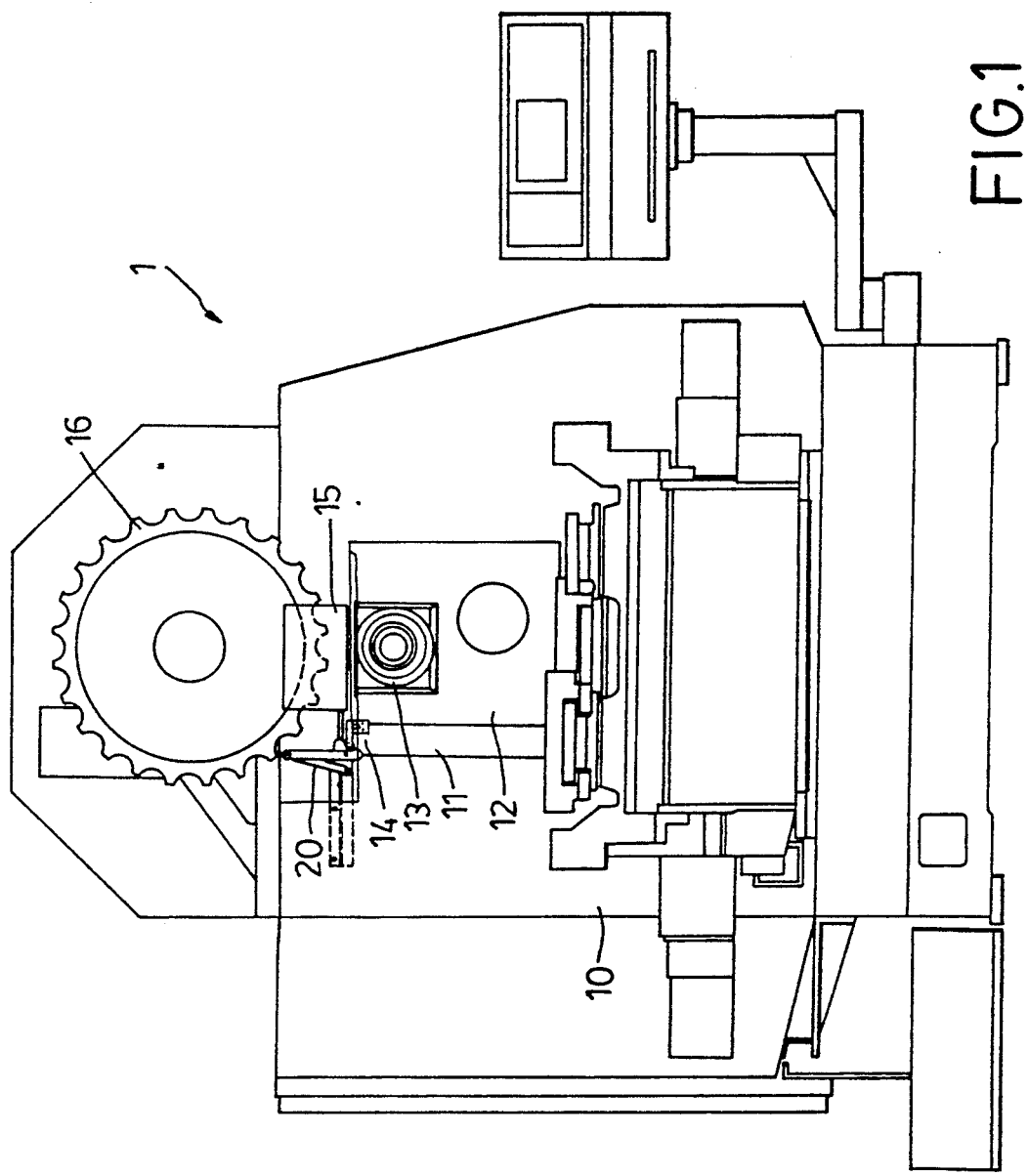
FIG. 1 is a perspective, schematic view of a cutting machine in which a door moving mechanism of the present invention is be incorporated.
Figure 2:
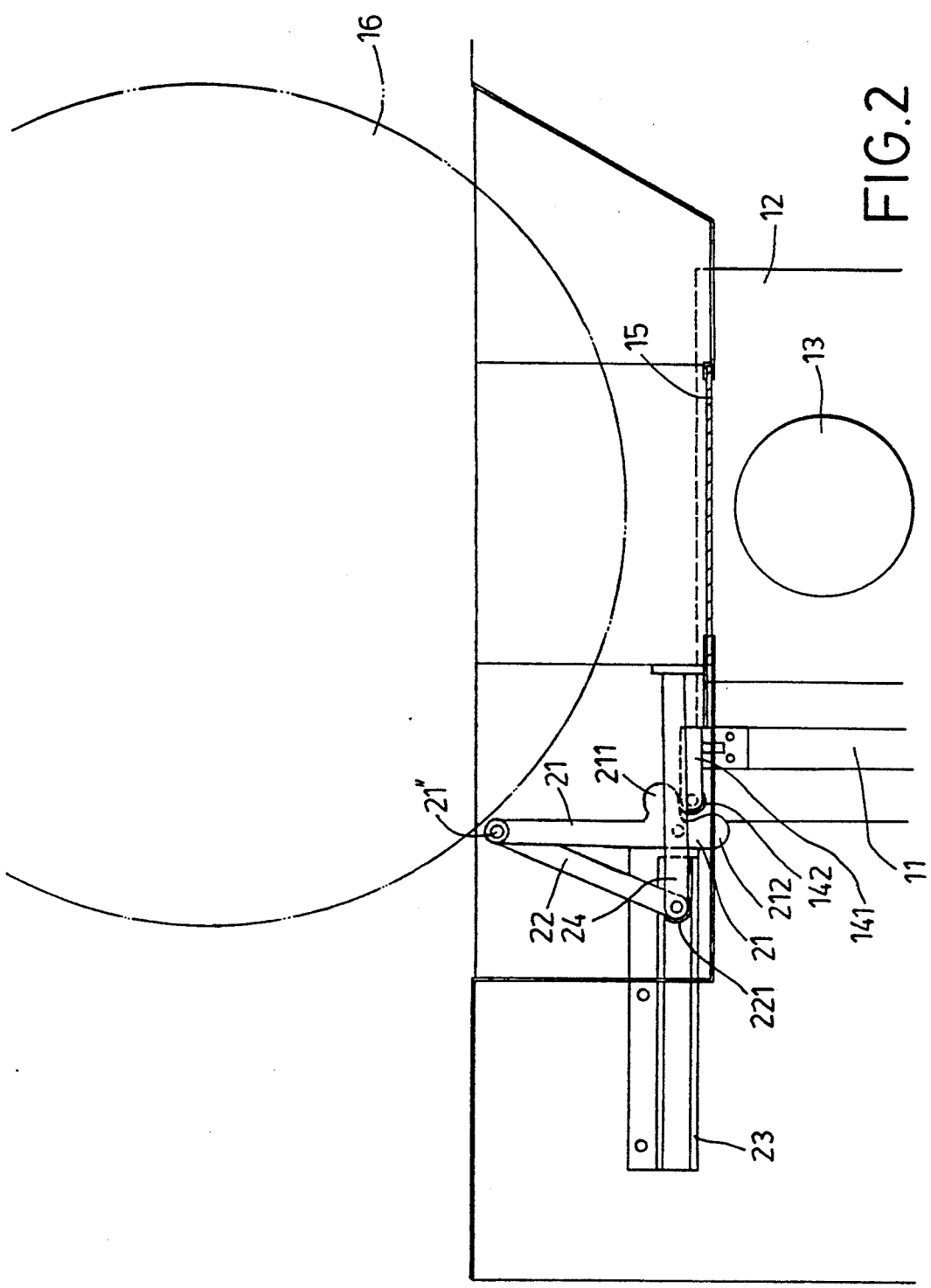
FIG. 2 shows a door moving mechanism of the present invention.

Referring to FIG. 2, a door moving mechanism according to the present invention is to be incorporated in the cutting machine of the prior art. Therefore, the remaining structures are unchanged and are not related to the present invention so that detailed description of them will be omitted throughout this specification.

Referring to Figure a cutting machine (1) incorporated with a door moving mechanism of the present invention includes a machine body (10), an upright support (11) with a slide rail adjacent to the machine body, a cutter exchanging plate (16) rotatably provided on the machine body (10) above the upright support and a casing (12) mounted on the upright support (11) and movable along the slide rail downward to a first position and upward to a second position above the first position. The casing (12) has a surrounding wall with an open top and a cutting device (13) is provided therein which is operable when the casing (12) is at the first position and which is adapted to be exchange for a new cutter with the cutter exchanging plate (16) when the casing (12) is moved upward to the second position. The machine further includes a door covering mechanism (15) provided on the machine body horizontally movable between a covering position and an uncovering position. In the covering position, the door covering mechanism covers the open top of the casing (12) such that scraps and juice of food being minced therein, such as pork meat, will not spill out from the open top of the casing (12). In the uncovering position, the casing (12) moves upward to a second position to permit the cutter exchanging operation to take place.

Figure 3:
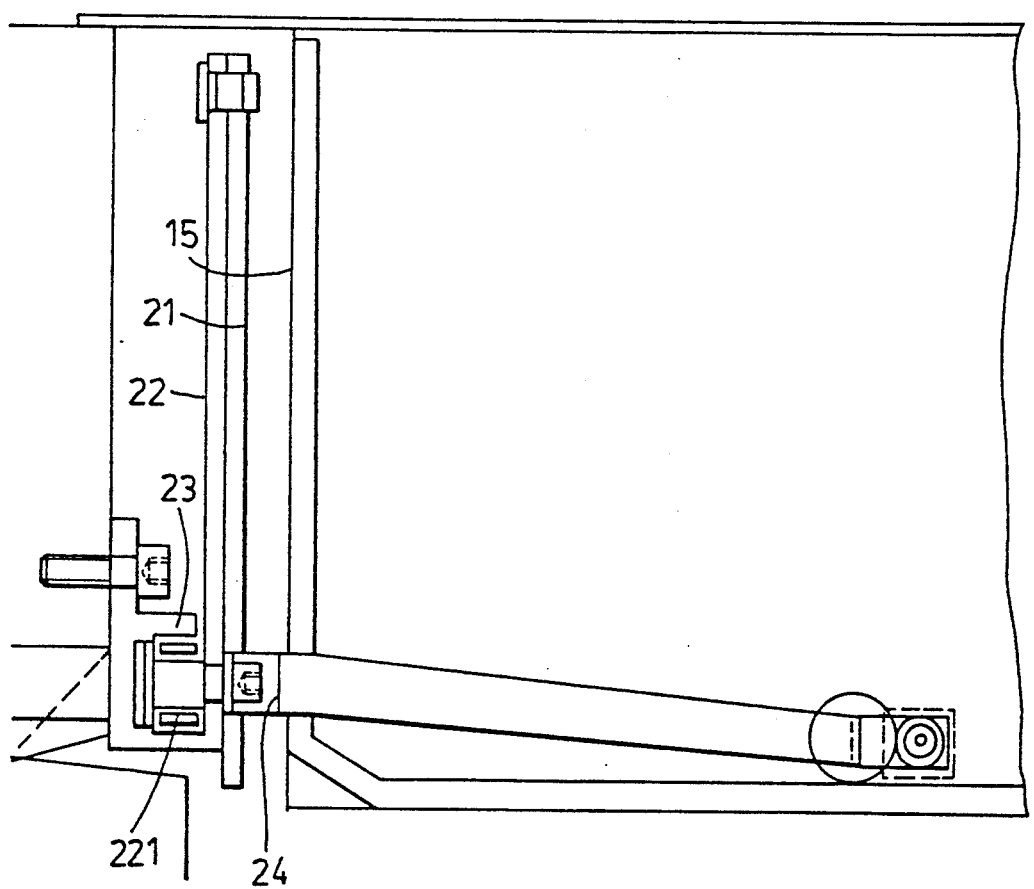
FIG. 3 is the door moving mechanism of FIG. 2 viewed from the front.

Referring to FIGS. 2 and 3, the door moving mechanism of the present invention includes a horizontal guide rail (23) mounted on the machine body immediately above the upright support (11), and a connecting rod (24) is slidably provided on the guide rail (23) and has a first end connected to the door covering mechanism (15). An elongated first rod (21) has a first end (21') pivoted on the machine body adjacent to the upright support (11) and the horizontal guide rail (23) and a second end (21") opposite to the first end (21'). The first rod (21) further has a first lobed part (211) and a second lobed part (212) formed thereon adjacent to the pivot point thereof. Each of the first and second lobed parts (212,211) respectively have a first and second contact face which cooperatively define a receiving space therebetween. The first contact face is above a horizontal line drawn across the pivot point of the elongated first rod (21) and the second contact face is below the horizontal line.

An elongated second rod (22) has a first end pivoted to the second end (21") of the elongated first rod (21) and a second end pivoted to a second end of the connecting rod (24).

A pushing rod (141) is provided at the topmost portion of the casing (12) and includes a free end on which a wheel (142) is rotatably mounted. Under this condition, the free end of the pushing rod (141) extends into the receiving space defined by two contact faces of the first and second lobed parts (211,212) of the elongated first rod (21) and abuts against one of the contact faces such that movement of the casing (12) along the upright support (11) pushes one of the contact faces so that the first rod pivots in a first direction and a second direction opposite to the first direction.

Referring to FIG. 4, when the casing (12) is moved upward to the second position on the upright support (11), the wheel (142) of the pushing rod (141) abuts against and pushes the first contact face of the first lobed part (211) of the elongated first rod (21) so that the first rod (21) pivots in a counter-clockwise direction such that the connecting rod (24) is pushed leftwise thereof. The door covering mechanism (15) connected to the connecting rod (24) correspondingly moves to the left side and uncovers the open top of the casing (12). Under this condition the cutting device (13) of the casing (12) is exchanged for a new cutter from the cutter exchanging plate (16).

Referring to FIG. 5, when the casing (12) is moved downward to the first position on the upright support (11), the wheel (142) of the pushing rod (141) abuts against and pushes the second contact face of the second lobed part (212) of the elongated first rod (21) such that the first rod (21) pivots in a clockwise direction, correspondingly moving the connecting rod (24) to a right side covering the open top of the casing (12). Under this condition, the cutting device (13) in the casing operates, when mincing the meat, etc, therein, such that scraps and juice that seep out from the minced meat are prevented by the door covering mechanism from spilling out of the casing (12).

When the casing is moved, what moves the casing and at what interval the moving means is actuated to move the casing can be the same as in the prior art machine and are not directly concerned with the present invention. Such is therefore omitted here.

As illustrated and explained above, the casing (12) in the preferred embodiment does not need to travel a full length, rather, a slight movement which correspondingly takes less time when compared to the full length traveled by the piston rod of the prior art can accomplish the purpose of covering or uncovering the open top of the casing. This is distinguishing feature the door moving mechanism of the prior art cutting machine fails to provide.

While a preferred embodiment has been illustrated and described, it will be apparent that many changes and modifications may be made in the general construction and arrangement of the present invention without departing from the scope and spirit thereof. Therefore, it is desired that the present invention be not limited to the exact disclosure but only to the extent of the appended claims.

I claim:

1. A cutting machine including a machine body, an upright support adjacent to said machine body and a casing mounted on said upright support movable upward and downward along said upright support and having a surrounding side wall and an open top, said casing having a cutting device provided therein and operable when said casing is moved downward to a first position, said machine further having a cutter exchanging plate rotatably provided on said machine body above said upright support and adapted to exchange a cutter with said cutting device of said casing when said casing moves upward to a second position above said first position, a door covering mechanism provided on said machine body immediately above said upright support between said cutter exchanging plate and said upright support and being slidable in a horizontal direction between a third position covering said open top of said casing when said casing is at said first position, and a fourth position uncovering said open top of said casing when said casing is at said second position to permit the cutter exchanging operation, and a door moving mechanism for moving said door covering mechanism;

the improvement comprising: said moving mechanism including a horizontal guide rail disposed on said machine body immediately above said upright support;

a connecting rod provided slidably in said horizontal guide rail and having first end attached to said door covering mechanism and a second end;

an elongated first rod having a first end pivoted on said machine body adjacent to said upright support and said guide rail and a second end opposite to said first end, said elongated first rod further having a first lobed part and a second lobed part formed thereon adjacent to said pivot point, said first and second lobed parts respectively having a first contact face and a second contact face and cooperatively defining a receiving space therebetween, said first and second contact faces respectively being above and below a horizontal line drawn across said pivot point;

an elongated second rod has a first end pivoted to said second end of said elongated first rod and a second end pivoted to said second end of said connecting rod;

said casing having a push member formed at an uppermost portion thereof and including a push rod, a free end of which extends into said receiving space to abut against one of said contact faces upon movement of said casing along said upright support;

whereby movement of said casing upwardly along said upright support causes said free end of said push rod to abut against said first contact face of said first lobed thereby pivoting said elongated first rod in a first direction, said second elongated rod correspondingly moves said connecting rod along said guide rail such that said door covering mechanism moves from said third position to said fourth position; and whereby movement of said casing downwardly along said upright support causes said free end of said push rod to abut against said second contact face of said second lobed part thereby pivoting said elongated first rod in a second direction opposite to said first direction wherein said elongated second rod correspondingly moving said connecting rod along said guide rail such that said door covering mechanism moves from said fourth position to said third position.

* * * * *